(12) United States Patent
Yoshida et al.

(10) Patent No.: US 9,639,955 B2
(45) Date of Patent: May 2, 2017

(54) DISPLAY CONTROL DEVICE FOR VEHICLE

(71) Applicant: MAZDA MOTOR CORPORATION, Hiroshima (JP)

(72) Inventors: Makoto Yoshida, Hiroshima (JP); Yoshitaka Fujihara, Hiroshima (JP); Yohei Iwashita, Hiroshima (JP); Yoko Hoshino, Hiroshima (JP); Akira Kaino, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 217 days.

(21) Appl. No.: 14/601,684

(22) Filed: Jan. 21, 2015

(65) Prior Publication Data

US 2015/0243046 A1    Aug. 27, 2015

(30) Foreign Application Priority Data

Feb. 25, 2014 (JP) .................................. 2014-033947
Dec. 11, 2014 (JP) .................................. 2014-250666

(51) Int. Cl.
*H04N 7/18* (2006.01)
*G06F 3/0482* (2013.01)
(Continued)

(52) U.S. Cl.
CPC ........ *G06T 7/2066* (2013.01); *G02F 1/13338* (2013.01); *G06F 3/013* (2013.01);
(Continued)

(58) Field of Classification Search
CPC ........... G06K 9/00778; G06K 9/00785; G06K 9/00791; G06K 9/00798; G06K 9/00805; G06K 9/00812; G06K 9/00818; G06K 9/00825; G06K 9/00832; G06K 9/00845; G06K 9/325; G06K 2209/15; G06T 2207/30236; G06T 2207/30248; G06T 2207/30252; G06T 2207/30256; G06T 2207/30264; G06T 2207/30268; G06T 7/70; B60R 2300/86; G02F 1/13338; G06F 3/013; G06F 3/0482; G06F 3/14
(Continued)

(56) References Cited

U.S. PATENT DOCUMENTS

| | | | | |
|---|---|---|---|---|
| 8,521,411 B2* | 8/2013 | Grabowski | .......... | G01C 21/365 |
| | | | | 701/454 |
| 2007/0225933 A1* | 9/2007 | Shimomura | ....... | G06K 9/00791 |
| | | | | 702/127 |

(Continued)

*Primary Examiner* — Nathnael Aynalem
(74) *Attorney, Agent, or Firm* — Studebaker & Brackett PC

(57) ABSTRACT

A display control device for a vehicle, which is applied to a vehicle provided with an outside camera to image scenery in front of the vehicle and a display portion visible and operable for a driver, comprises an optical-flow presumption portion which presumes an optical flow based on the front scenery imaged by the outside camera, an additive-display-line setting portion to set an additive-display line to be applied to the display portion according to the optical flow presumed by the optical-flow presumption portion, and a display control portion to conduct a display control for the display portion based on the additive-display line set by the additive-display-line setting portion.

14 Claims, 7 Drawing Sheets

(51) Int. Cl.
*G06T 7/20* (2017.01)
*G02F 1/1333* (2006.01)
*G06F 3/01* (2006.01)
*G09G 5/00* (2006.01)
*G06F 3/14* (2006.01)
*G06T 7/70* (2017.01)
G06K 9/00 (2006.01)

(52) U.S. Cl.
CPC .............. *G06F 3/0482* (2013.01); *G06F 3/14* (2013.01); *G06T 7/70* (2017.01); *G09G 5/003* (2013.01); *G06K 9/00791* (2013.01); *G06T 2207/30252* (2013.01); *G09G 2340/125* (2013.01); *G09G 2354/00* (2013.01); *G09G 2380/10* (2013.01)

(58) Field of Classification Search
USPC .......................................... 348/113, 118, 148
See application file for complete search history.

(56) References Cited

U.S. PATENT DOCUMENTS

2009/0171529 A1 7/2009 Hayatoma
2014/0139655 A1* 5/2014 Mimar ............... G08B 21/0476
348/77

* cited by examiner

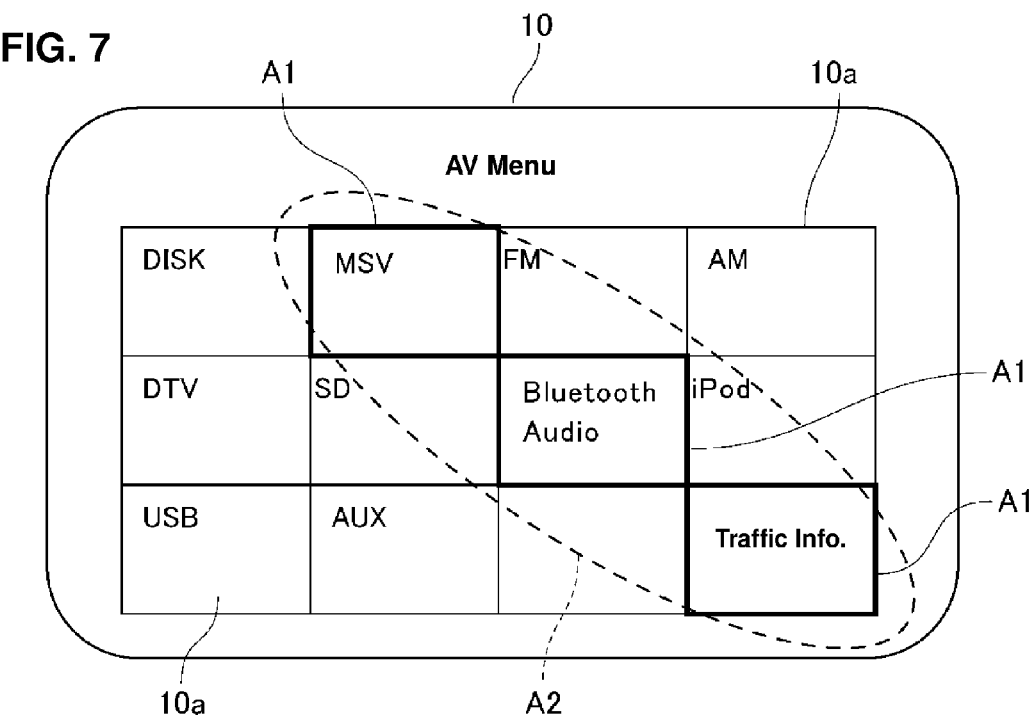
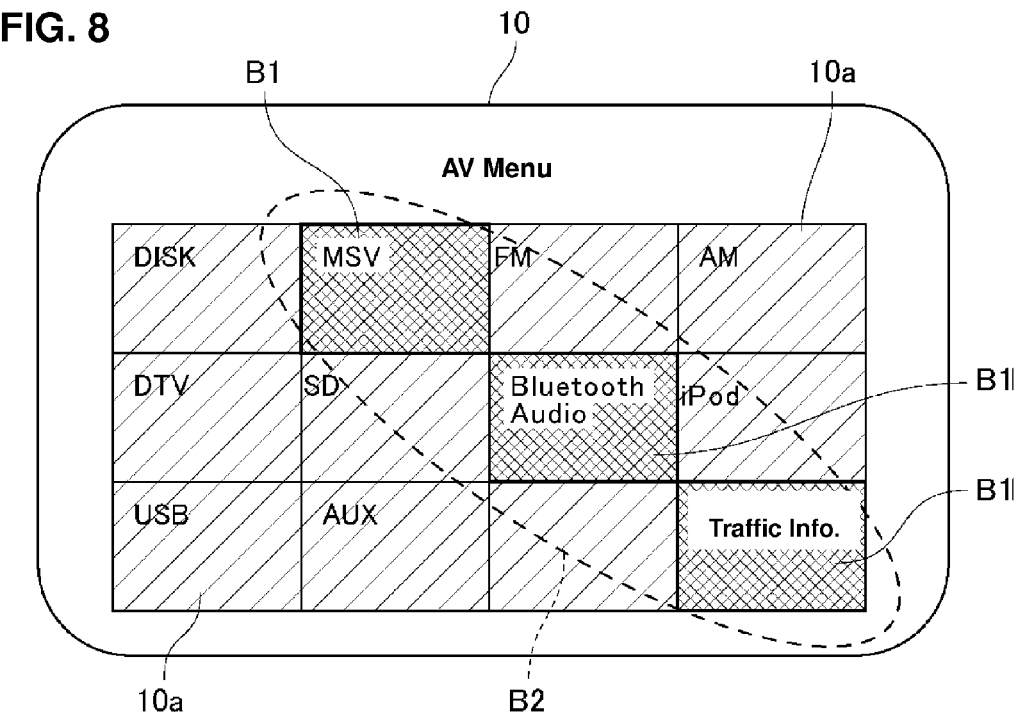

DISPLAY CONTROL DEVICE FOR VEHICLE

BACKGROUND OF THE INVENTION

The present invention relates to a display control device for a vehicle, and particularly relates to the display control device for the vehicle which is applied to a vehicle provided with a display portion which is visible and operable for a driver.

A human machine interface (HMI) of a vehicle which is properly visible and operable for a driver has been recently desired. An exemplified technology of that is disclosed in U.S. Patent Application Publication No. 2009/0171529 A1, for example. In this technology, a screen which is frequently used by the driver according to a driving state is displayed at a position close to the driver.

According to the technology of the above-described patent publication, the moving distance of driver's eyes for seeing the displayed screen is properly short, so that the visually-recognition time of the driver can be shortened. However, even if the visually-recognition time is shortened, there is a concern that the driver's eyes may not stabilize at a position to which the driver's eyes have moved, so that the operational time becomes long. Consequently, the driver may turn away the driver's eyes from the direction toward a traveling way for an improperly-long period of time.

SUMMARY OF THE INVENTION

The present invention has been devised to solve the above-described problem, and an object of the present invention is to provide a display control device for a vehicle which can properly shorten the visually-recognition time and the operational time of the driver.

According to the present invention, there is provided a display control device for a vehicle, which is applied to a vehicle provided with an outside camera to image scenery in front of the vehicle and a display portion visible and operable for a driver, comprising an optical-flow presumption portion to presume an optical flow based on the front scenery imaged by the outside camera, an additive-display-line setting portion to set an additive-display line to be applied to the display portion according to the optical flow presumed by the optical-flow presumption portion, and a display control portion to conduct a display control for the display portion based on the additive-display line set by the additive-display-line setting portion.

In the present invention, since the additive-display line is set according to the optical flow presumed based on the front scenery imaged by the outside camera and the display control for the display portion is conducted based on this additive-display line, the additive-display line which considers the optical flow is recognized by the driver, so that the driver's attention can be attracted to the display portion easily and therefore the visually-recognition time and the operational time of the display portion can be shortened. Accordingly, the driver can be properly restrained from turning away the driver's eyes for operating the display portion from an appropriate direction to be directed during the vehicle driving (i.e., a direction toward a traveling way) by shortening the above-described times.

According to an embodiment of the present invention, the additive-display-line setting portion is configured to obtain an imaginary flow which is generated by extending the optical flow presumed by the optical-flow presumption portion to a position where the display portion is located and set a line which is inclined at a specified angle relative to a direction of the imaginary flow as the additive-display line. In this embodiment, since the additive-display line is inclined at the specified angle relative to the direction of the imaginary flow generated by extending the optical flow to the position where the display portion is located, the visually-recognition characteristics of the human can be taken into consideration properly, so that the visually-recognition time and the operational time of the display portion can be shortened effectively.

Herein, it is preferable that the above-described specified angle be 50 degrees or greater. Thereby, the visually-recognition characteristics of the human being can be taken into consideration more properly, so that the visually-recognition time and the operational time of the driver for the operational device can be shortened greatly.

According to another embodiment of the present invention, the optical-flow presumption portion is configured to presume a vanishing point of the optical flow based on the front scenery imaged by the outside camera as the presumption of the optical flow, and the additive-display-line setting portion is configured to obtain the imaginary flow based on the vanishing point presumed by the optical-flow presumption portion and a relative position to the display portion and set the additive-display line. In this embodiment, since the vanishing point of the optical flow is presumed and the imaginary flow is obtained based on this vanishing point and the relative position to the display portion, the imaginary flow according to the position of the vanishing point can be obtained properly. Specifically, while the position of the vanishing point changes according to the traveling states, such as curve traveling or straight traveling, the imaginary flow generated at the position where the display portion is located according to such a position change of the vanishing point can be obtained properly, so that the proper additive-display line can be set.

According to another embodiment of the present invention, the display control device further comprises a driver-state presumption portion to presume a driver's state based on an image of a driver which is imaged by an inside camera provided in the vehicle, wherein the optical-flow presumption portion is configured to presume the vanishing point based on the driver's state presumed by the driver-state presumption portion and the front scenery imaged by the outside camera. In this embodiment, since the above-described presumption of the vanishing point is conducted by using both the driver's state presumed based on the driver's image imaged by the inside camera and the front scenery imaged by the outside camera, even in a case in which any other vehicle traveling in front of the own vehicle or the like are included in the front scenery so that it becomes difficult to presume the vanishing point properly by using the front scenery only, the vanishing point of the optical flow can be presumed properly through compensation using the driver's state, such as the direction of driver's eyes. Further, the presumption of the vanishing point which considers individual differences, such as a driver's body size, can be attained properly by using the driver's state, so that the setting of the additive-display line which considers the driver's individual differences can be attained properly.

According to another embodiment of the present invention, the display control portion is configured to make the display portion display plural operational portions which are operable for the driver such that part of the plural operational portions is displayed in a different display manner from the other part of the plural operational portions, whereby the additive-display line is formed at the display portion. In this embodiment, by changing the display manner of a specified operational portion among the plural operational portions differently from that of the other's than this specified one, the driver can be made properly to visually recognize the imaginary line portion which corresponds to the above-described additive-display line by the visual effects.

Other features, aspects, and advantages of the present invention will become apparent from the following description which refers to the accompanying drawings.

BRIEF DESCRIPTION OF THE DRAWINGS

FIG. 7 is a diagram showing a first example of an operational device for a vehicle to which the display control device for the vehicle according to the present embodiment is applied.

FIG. 8 is a diagram showing a second example of the operational device for the vehicle to which the display control device for the vehicle according to the present embodiment is applied.

DETAILED DESCRIPTION OF THE INVENTION

Hereinafter, an embodiment of the present invention will be described referring to the accompanying drawings.

First, the phenomena which the inventors of the present invention have found will be described referring to FIGS. 1 through 3 before describing contents of the embodiment of the present invention.

Figure 1:
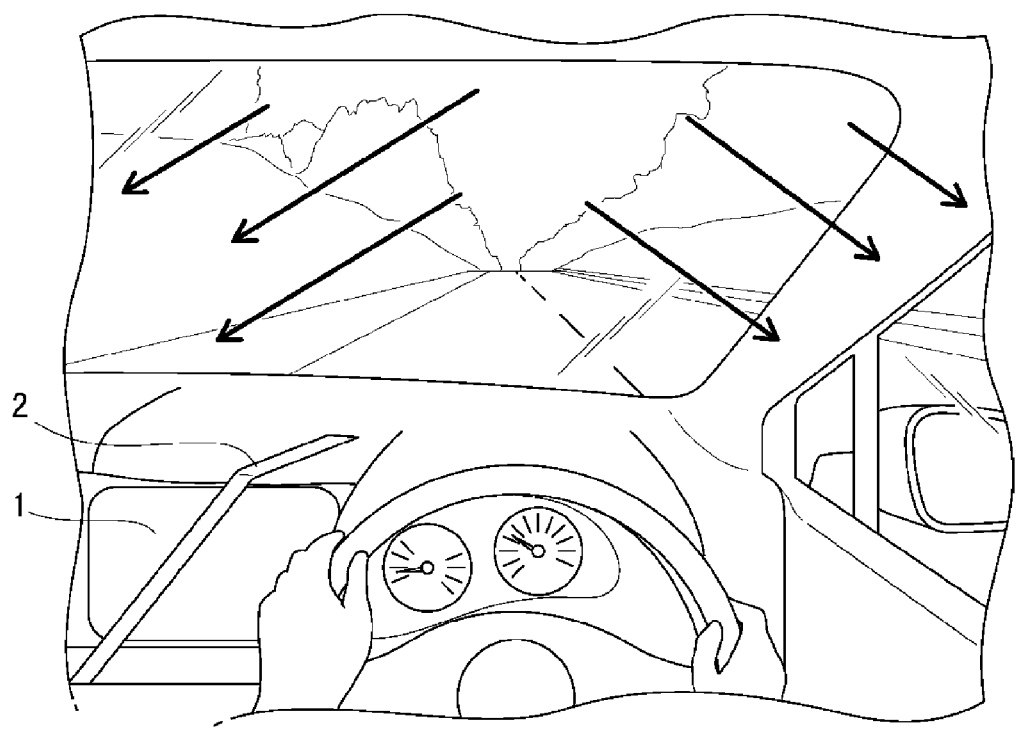
FIG. 1 is a diagram explaining a situation of the present experiment.

FIG. 1 explains a situation of the present experiment. The present experiment measures an operational time of a driver for an operational device for the experiment 1 during vehicle traveling which is provided at an instrument panel of the vehicle. A strip of additive-display line 2 which adds a display to the operational device for the experiment 1 is put (pasted) on the operational device for the experiment 1 across the device. This additive-display line 2 is a white-colored tape, for example. The driver visually recognizes optical flows illustrated by solid-line arrows in FIG. 1 during the vehicle traveling. The optical flows mean a velocity field of whole images of the outside which are projected on the retina of the human being. Particularly, the optical flows shown in FIG. 1 are generated when a self straight-advancing movement is conducted, and becomes the velocity field which extends in a radial direction from an extension center (i.e., a vanishing point) positioned in an advancing direction.

Figure 2:
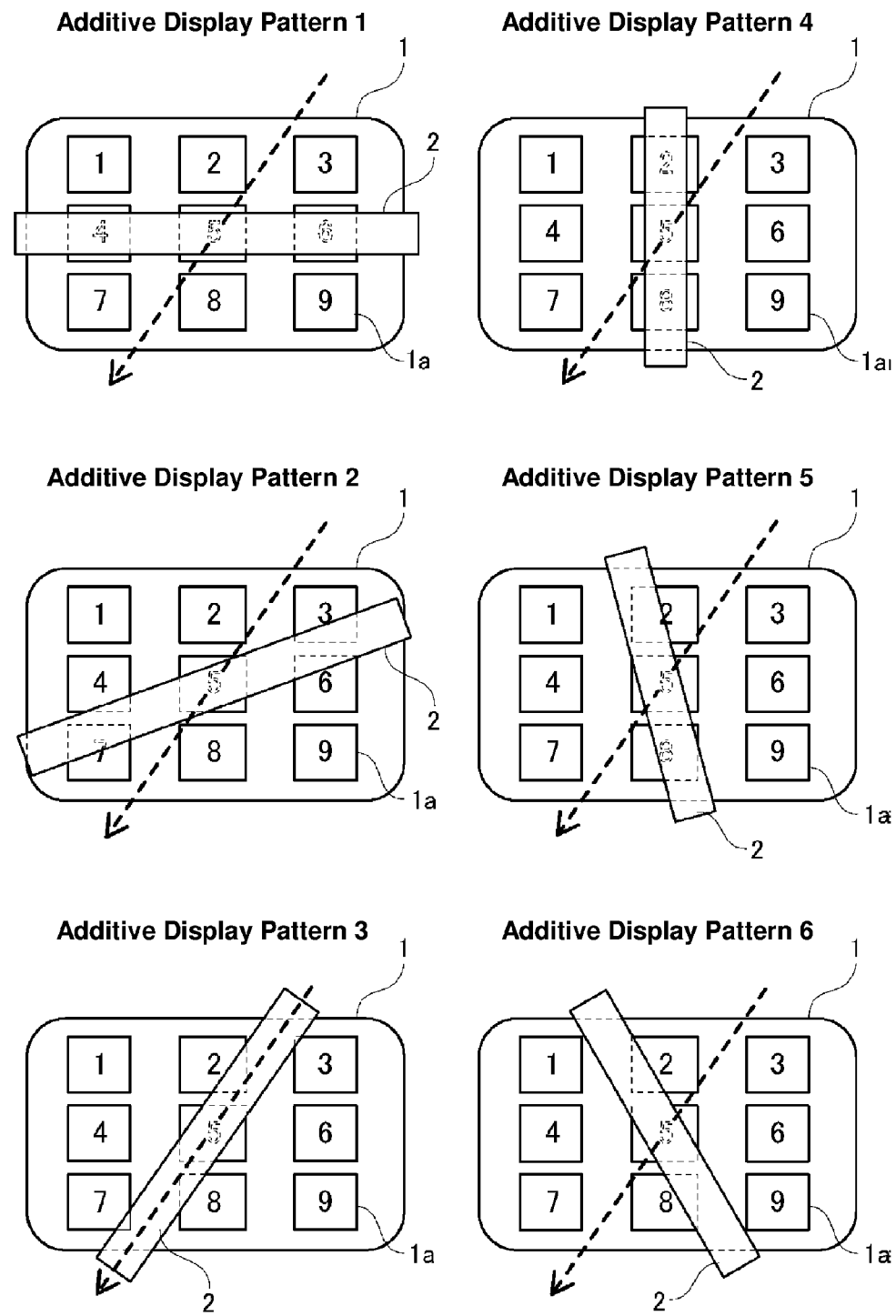
FIG. 2 is a diagram explaining constitution of an operational device for the experiment.

FIG. 2 specifically explains the constitution of the operational device for the experiment 1. As shown in FIG. 2, the constitution of the operational device for the experiment 1 comprises nine buttons 1a with the figures of 1-9 attached, and the additive-display line 2 is put on the front of the device 1. In the present experiment, plural additive display patterns 1-6 in which an angle of the additive-display line 2 relative to the device 1 is different among these patterns are used, and the operational time of the driver for this device 1 is measured in each of the cases of using these additive display patterns 1-6. Specifically, when any one of the nine buttons 1a of the device 1 is lit, an operational time of the driver for pushing the lit button 1a, that is—how long it takes for the driver to push the lit button 1a after the driver has visually recognized the lit button 1a, is obtained as the above-described operational time. This operational time is the time which is required for the driver to visually recognize the button 1a and then operate (push) the button 1a. Thus, the operational time includes a visually-recognition time.

Further, in the additive display patterns 1-6, the respective additive-display lines 2 are put on the operational device for the experiment 1 with the respective angles relative to the direction of the imaginary flow (illustrated by a broken-line arrow) which corresponds to the optical flow visible for the driver during the vehicle traveling at a position where the operational device for the experiment 1 is located. In the additive display pattern 1, the additive-display line 2 is inclined at a clockwise angle of 55 degrees relative to the direction of the imaginary flow. In the additive display pattern 2, the additive-display line 2 is inclined at the clockwise angle of 35 degrees relative to the direction of the imaginary flow. In the additive display pattern 3, the additive-display line 2 matches the direction of the imaginary flow. In the additive display pattern 4, the additive-display line 2 is inclined at a counterclockwise angle of 35 degrees relative to the direction of the imaginary flow. In the additive display pattern 5, the additive-display line 2 is inclined at the counterclockwise angle of 50 degrees relative to the direction of the imaginary flow. In the additive display pattern 6, the additive-display line 2 is inclined at the counterclockwise angle of 65 degrees relative to the direction of the imaginary flow.

Herein, the imaginary flow is an imaginary optical flow at the position where the operational device for the experiment 1 is located. Specifically, the imaginary flow corresponds to the optical flow which is generated during the vehicle traveling at the position where the operational device for the experiment 1 is located in a case in which the operational device for the experiment 1 does not exist, i.e., corresponds to the optical flow which is visually recognized in a case in which the driver sees through the operational device for the experiment 1.

Figure 3:
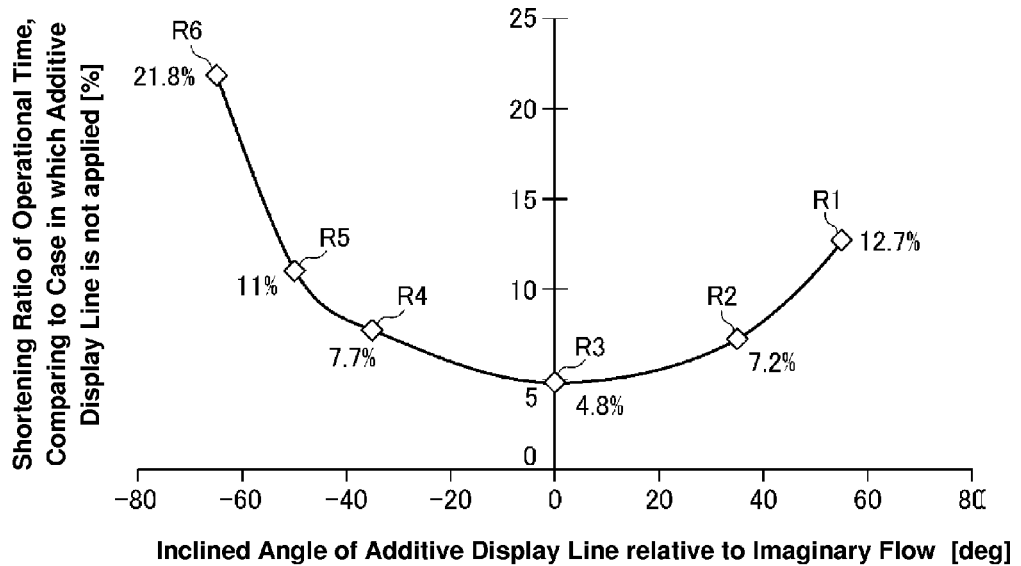
FIG. 3 is a graph showing results of the present experiment.

FIG. 3 shows results of the above-described experiment. In FIG. 3, the abscissa represents the angle (degree) of the additive-display line 2 relative to the imaginary flow, and the ordinate represents the shortening ratio (%) comparing to the case in which the additive-display line 2 is not applied to the operational device for the experiment 1. The experiment's results shown by reference characters R1-R6 show the additive patterns 1-6, respectively. The shortening ratio (%) of the ordinate becomes 0(%) when the visually-recognition time is the same as that of the case in which the additive-display line 2 is not applied to the operational device for the experiment 1, and the magnitude of the shortening ratio (%) becomes greater as the visually-recognition time becomes shorter than that of the case in which the additive-display line 2 is not applied to the operational device for the experiment 1.

From the experiment's results shown in FIG. 3, it has been found that the operational time for the operational device for the experiment 1 of the case in which the additive-display line 2 is applied to the operational device for the experiment 1 is shortened, compared to the case in which the additive-display line 2 is not applied to the operational device for the experiment 1. Further, it has been found that the operational time is more shortened as the angle of the additive-display line 2 relative to the direction of the imaginary flow becomes greater. Particularly, when the angle of the additive-display line 2 relative to the direction of the imaginary flow becomes 50 degrees or greater, the operational time is shortened greatly (see the reference characters R1, R5, R6, for example).

Based on the above-described experiment's results, a line portion which is visible for the driver and performs the same function as the above-described additive-display line 2 (which corresponds to a line-shaped portion and, hereafter will be referred to as a "line portion" or an "additive-display line") is provided at a display portion as an operational device for a vehicle in the present embodiment. Specifically, in the present embodiment, an imaginary line portion which is visibly and imaginarily recognizable for the driver is used. Further, this line portion is provided to be inclined relative to the direction of the imaginary flow which corresponds to the optical flow visible for the driver during the vehicle traveling at the position where the display portion is located in the present embodiment. Preferably, the line portion is inclined at the angle of 50 degrees or greater relative to the direction of the imaginary flow from the experiment's results shown in FIG. 3.

Hereafter, the display control device for the vehicle of the present embodiment will be described referring to FIGS. 4 through 6.

Figure 4:
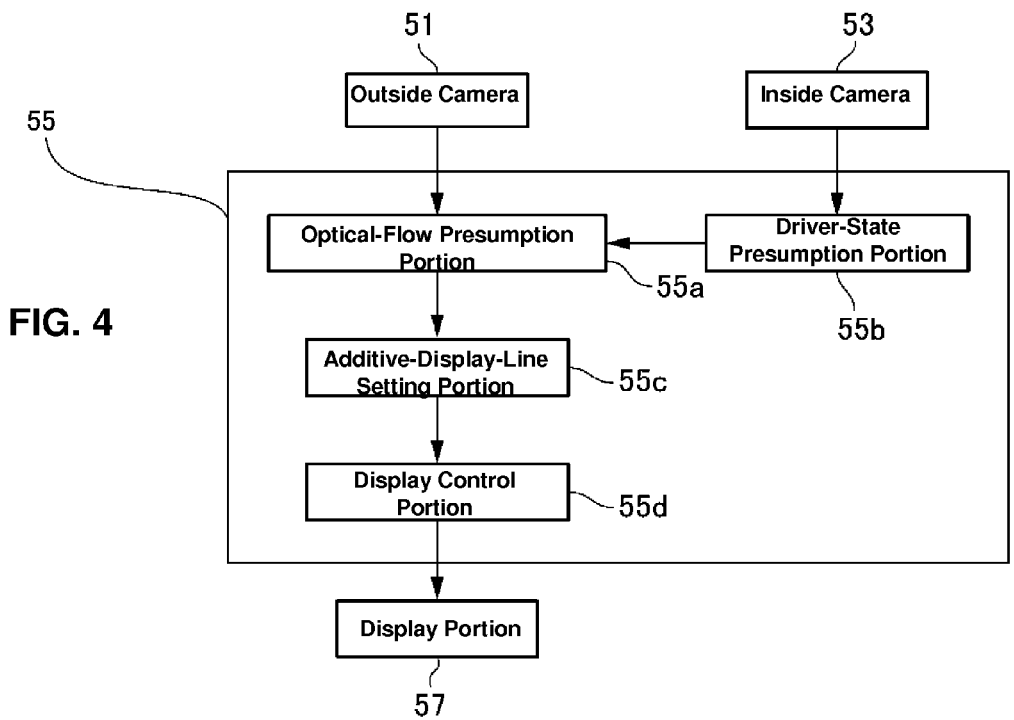
FIG. 4 is a block diagram showing schematic constitution of a display control device for a vehicle according to the present embodiment.

FIG. 4 is a block diagram showing schematic constitution of the display control device for the vehicle according to the present embodiment.

As shown in FIG. 4, a display control device for a vehicle 55 functionally comprises an optical-flow presumption portion 55a, a driver-state presumption portion 55b, an additive-display-line setting portion 55c, and a display control portion 55d. The display control device for the vehicle 55 is a controller which is applied to a display portion 57 as an operational device for a vehicle (a navigation device, an audio device, etc.) arranged at an instrument panel or the like in the vehicle and conducts a display control for the display portion 57. The display control device for the vehicle 55 is comprised of a CPU (Central Processing Unit), various kinds of program executed on the CPU (including a basic control program, such as OS, and application programs which are activated by the OS to perform specified functions), internal memories, such as ROM (Read Only Memory) and RAM (Random Access Memory), and so on, which are not illustrated.

The above-described optical-flow presumption portion 55a presumes an optical flow visible for a driver during the vehicle traveling based on at least an image of an outside camera 51 which images scenery in front of the vehicle (hereafter, will be referred to as an "outside-camera's image" suitably). Specifically, the optical-flow presumption portion 55a presumes a vanishing point of the optical flow as the above-described presumption of the optical flow. The above-described driver-state presumption portion 55b presumes driver's states, such as positions of face and eyes of the driver, the direction of driver's eyes, based on an image of an inside camera 53 which is provided in the vehicle and images a driver (hereafter, will be referred to as an "inside-camera's image" suitably). The optical-flow presumption portion 55a presumes the vanishing point of the optical flow by using the driver's states presumed by the driver-state presumption portion 55b additionally to the front scenery imaged by the outside-camera 51.

The above-described additive-display-line setting portion 55c sets the additive-display line to be applied to the display portion 57 based on the vanishing point of the optical flow presumed by the optical-flow presumption portion 55a. Specifically, the additive-display-line setting portion 55c obtains the imaginary flow which is generated by extending the optical flow to the position where the display portion 57 is located based on the presumed vanishing point of the optical flow and a relative position to the display portion 57 provided in the vehicle, and sets a line which is inclined at a specified angle relative to a direction of this imaginary flow as the additive-display line. Preferably, the additive-display-line setting portion 55c sets the line inclined at the angle of 50 degrees or greater relative to the direction of the imaginary flow as the additive-display line from the experiment's results shown in FIG. 3. Then, the above-described display control portion 55d conducts the display control for the display portion 57 based on the additive-display line set by the additive-display-line setting portion 55c.

Figure 5:
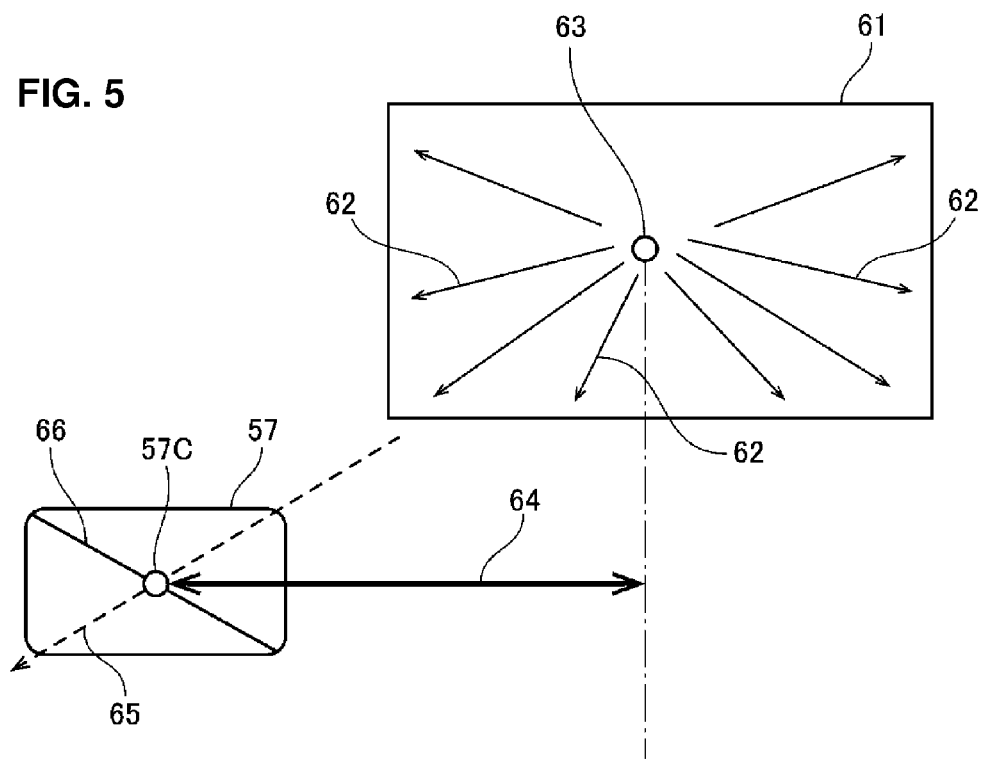
FIG. 5 is a diagram explaining a basic concept of a control conducted by the display control device for the vehicle according to the present embodiment.

FIG. 5 is a diagram explaining a basic concept of a control conducted by the display control device for the vehicle 55 according to the present embodiment.

First, the optical-flow presumption portion 55a of the display control device for the vehicle 55 presumes a vanishing point 63 of an optical flow 62 which is generated in a visual range 61 of the driver based on the front scenery imaged by the outside camera 51 or both this front scenery and driver's states presumed by the driver-state presumption portion 55b. Next, the additive-display-line setting portion 55c of the display control device for the vehicle 55 obtains the direction (angle) of an imaginary flow 65 which extends from the vanishing point 63 presumed by the optical-flow presumption portion 55a to the display portion 57 along the same direction as the optical flow. In this case, the additive-display-line setting portion 55c obtains the direction of the imaginary flow 65, which is shown by reference character 64, based on a relative positional relation of the position of the vanishing point 63 and the position of the display portion 57 (the position of a central point 57 of the display portion 57, for example). Thereby, the direction of the imaginary flow 65 which changes according to the positional relation of the vanishing point and the display portion 57 is obtained (basically, the position of the display portion 57 does not change but the position of the vanishing point 63 changes, so that the direction of the imaginary flow 65 changes because the position of the vanishing point 63 changes). And, the additive-display-line setting portion 55c sets the line inclined by the specified angle (50 degrees or greater, for example) relative to the direction of the imaginary flow 65 which is obtained as described above as the additive-display line 65.

Figure 6:
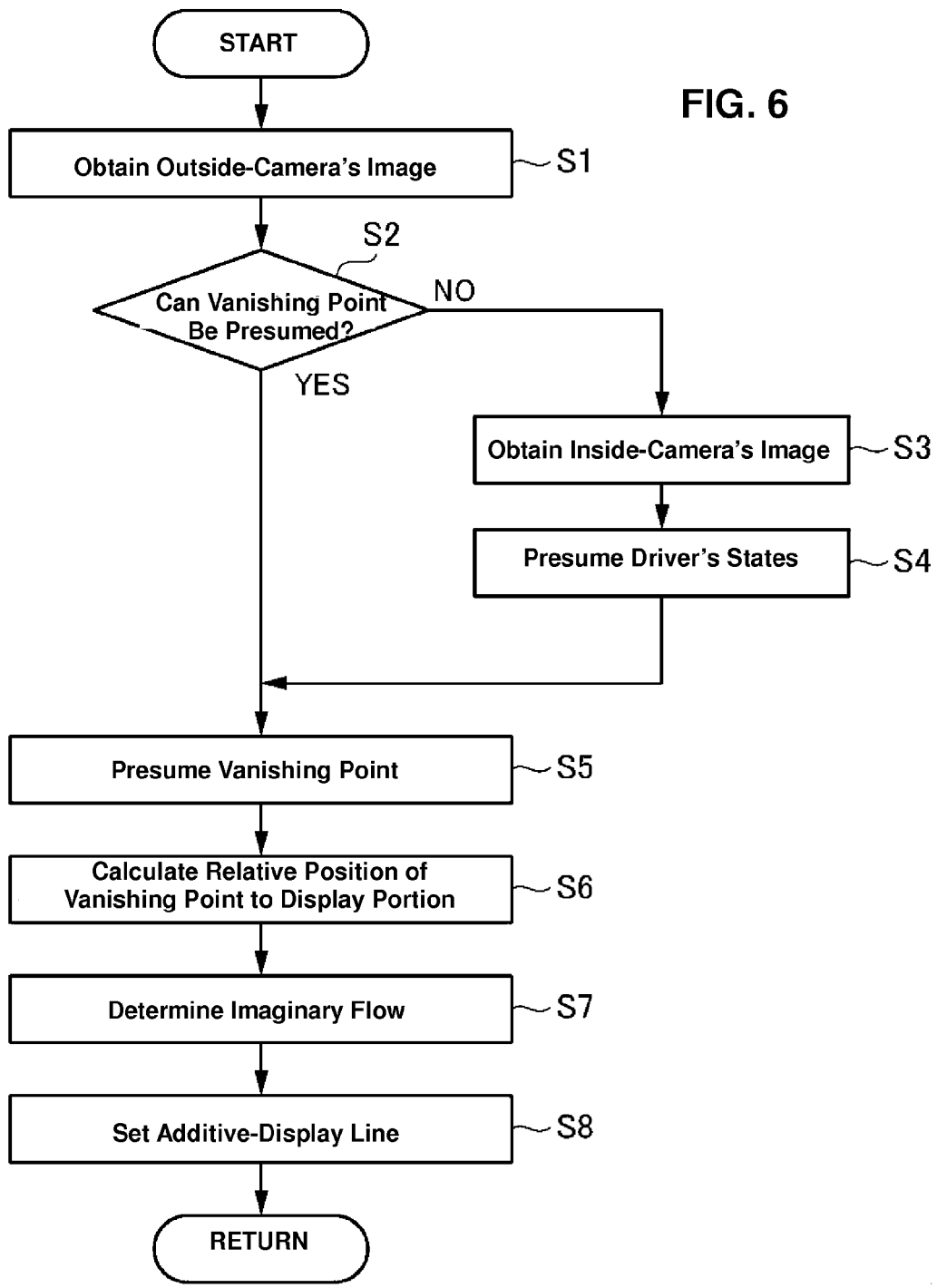
FIG. 6 is a flowchart executed by the display control device for the vehicle according to the present embodiment.

FIG. 6 shows a flowchart executed by the display control device for the vehicle 55 according to the present embodiment. This flowchart is repeatedly executed at a specified interval by the display control device for the vehicle.

First, in step S1, the optical-flow presumption portion 55a of the display control device for the vehicle 55 obtains the image imaged by the outside camera 51 (i.e., the outside-camera's image). Specifically, the optical-flow presumption portion 55a obtains the front scenery imaged by the outside camera 51.

Next, in step S2, the optical-flow presumption portion 55a judges based on the front scenery imaged by the outside camera 51 whether the vanishing point of the optical flow can be presumed properly or not. In a case in which any other vehicle traveling in front of the own vehicle or the like are included in the front scenery imaged by the outside camera 51 (specifically, a portion corresponding to the vanishing point in the front scenery imaged), it becomes difficult to presume the vanishing point properly based on the front scenery imaged. Accordingly, the optical-flow presumption portion 55a conducts the judgment of the step S2 by analyzing the outside-camera's image imaged by the outside camera 51 and then judging whether any object which may prevent smooth presumption of the vanishing point is included in this outside-camera's image.

When it is judged that the vanishing point of the optical flow can be presumed properly from results of the judgment of the step S2 (the step S2: Yes), the control proceeds to step S5. In this case, the optical-flow presumption portion 55a presumes the vanishing point of the optical flow by analyzing the outside-camera's image imaged by the outside camera 51 (the step S5). For example, the optical-flow presumption portion 55a presumes a portion where the changing amount of the image is the lowest in plural timely-continuous outside-camera's images as the vanishing point of the optical flow. Herein, the position of the vanishing point of the optical flow changes according to the traveling states, such as the curve traveling or the straight traveling.

Meanwhile, when it is judged that the vanishing point of the optical flow cannot be presumed properly from the results of the judgment of the step S2 (the step S2: NO), the control proceeds to step S3, where the driver-state presumption portion 55b of the display control device for the vehicle 55 obtains the image imaged by the inside camera 53 (i.e., the inside-camera's image). Then, the control proceeds to step S4, where the driver-state presumption portion 55b presumes the driver's states, such as the direction of the driver's eyes, based on the positions of face and eyes of the driver and the like which are included in the inside-camera's image by analyzing the inside-camera's image. Then, in the step S5, the optical-flow presumption portion 55a presumes the vanishing point of the optical flow by compensating the front scenery imaged by the outside camera 51 (the vanishing point is unable to be presumed by this only) with the driver's states, such as the direction of the driver's eyes, presumed in the step S4. For example, the optical-flow presumption portion 55a presumes a position on the front scenery imaged which corresponds to the direction of the driver's eyes as the vanishing point of the optical flow on the assumption that the direction of the driver's eyes is directed toward the vanishing point.

The control proceeds to step S6 after the above-described step S5, where the additive-display-line setting portion 55c of the display control device for the vehicle 55 obtains a relative position of the vanishing point presumed in the step S5 to the display portion 57 provided in the vehicle. In this case, since the additive-display-line setting portion 55c obtains the relative position of the vanishing point to the display portion 57 by using the position of the display portion 57 which is memorized in advance (because the position of the display portion 57 is basically fixed).

Subsequently, the control proceeds to step S7, where the additive-display-line setting portion 55c obtains the direction (angle) of the imaginary flow 65 which extends along the same direction as the optical flow from the position of the vanishing point to the position of the display portion 57 (the position of the central point 57C of the display portion 57, for example).

Then, the control proceeds to step S8, where the additive-display-line setting portion 55c sets the line inclined at the specified angle (50 degrees or greater, for example) relative to the imaginary flow which is obtained in the step S7 as the additive-display line. Next, the display control portion 55d of the display control device for the vehicle 55 conducts the display control for the display portion 57 based on the additive-display line set by the additive-display-line setting portion 55c.

Hereafter, the operation and effects of the display control device for the vehicle 55 according to the present embodiment described above will be described.

In the display control device for the vehicle 55 according to the present embodiment, since the additive-display line is set according to the optical flow presumed based on the front scenery imaged and the display control for the display portion 57 is conducted based on this additive-display line, the additive-display line which considers the optical flow is recognized by the driver, so that the driver's attention can be attracted to the display portion 57 easily and therefore the visually-recognition time and the operational time of the display portion 57 can be shortened. Accordingly, the driver can be properly restrained from turning away the driver's eyes for operating the display portion 57 from an appropriate direction to be directed during the vehicle driving (i.e., the direction toward a traveling way) by shortening the above-described times.

Further, in the present embodiment, since the additive-display line is inclined relative to the direction of the imaginary flow generated by extending the optical flow to the position where the display portion 57 is located, the visually-recognition characteristics of the human can be taken into consideration properly, so that the visually-recognition time and the operational time of the display portion 57 can be shortened effectively. In particular, in the case in which the additive-display line is inclined at the angle of 50 degrees or greater relative to the direction of the imaginary flow, the visually-recognition characteristics of the human being can be taken into consideration more properly, so that the visually-recognition time and the operational time of the driver for the operational device 57 can be shortened greatly.

Moreover, in the present embodiment, since the vanishing point of the optical flow is presumed and the imaginary flow is obtained based on this vanishing point and the relative position to the display portion 57, the imaginary flow according to the position of the vanishing point can be obtained properly. Specifically, while the position of the vanishing point changes according to the traveling states, such as the curve traveling or the straight traveling, the imaginary flow generated at the position where the display portion 57 is located according to the position change of the vanishing point can be obtained properly, so that the proper additive-display line can be set.

Also, in the present embodiment, since the above-described presumption of the vanishing point is conducted by using both the driver's states presumed based on the image imaged by the inside camera 53 provided in the vehicle and the front scenery imaged by the outside camera 51, even in a case in which any other vehicle traveling in front of the own vehicle or the like are so included in the front scenery that it becomes difficult to presume the vanishing point properly by using the front scenery only, the vanishing point of the optical flow can be presumed properly through compensation using the driver's states, such as the direction of driver's eyes. Further, the presumption of the vanishing point which considers individual differences, such as a driver's body size, can be attained properly by using the driver's states, so that the setting of the additive-display line which considers the driver's individual differences can be attained properly.

Figure 9:
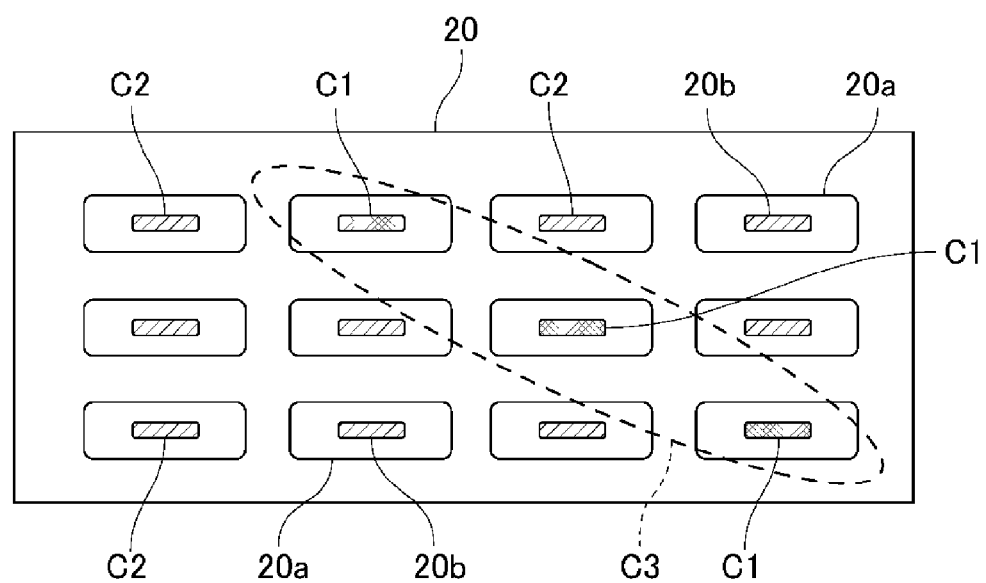
FIG. 9 is a diagram showing a third example of the operational device for the vehicle to which the display control device for the vehicle according to the present embodiment is applied.

Subsequently, concrete examples of the display control which the display control portion 55d of the display control device for the vehicle 55 conducts based on the additive-display line set by the additive-display-line setting portion 55c referring to FIGS. 7 through 9 will be described. In the present embodiment, the display control portion 55d conducts the display control so as to make the driver recognize the imaginary line portion which corresponds to the above-described additive-display line as if the imaginary line portion really exists there by visual effects. Hereafter, examples of an operational device for a vehicle as the display portion 57, to which the display control by the above-described display control portion 55d is applied, will be described.

First, referring to FIG. 7, a first example of the operational device for the vehicle to which the display control device for the vehicle according to the present embodiment is applied will be described. An operational device for the vehicle 10 as the above-described display portion 57, which is shown in FIG. 7, is a liquid-crystal display device which comprises a touch panel operable for the driver is provided at an instrument panel. The operational device for the vehicle 10 displays a selectable menu including plural menu buttons 10a (corresponding to icons) which are selectable through touching of this touch panel. Herein, an AV menu is displayed as an example. For example, the operational device for the vehicle 10 is a navigation device for the vehicle, an audio device, or the like.

In the first example of the present embodiment, the operational device for the vehicle 10 displays three menu buttons 10a with a specified-colored frame as shown by a reference character A1, respectively. Specifically, the operational device for the vehicle 10 displays these three menu buttons 10a with the frames along a line portion A2 so that an imaginary line illustrated by the broken line A2 is visibly and imaginarily recognizable for the driver. That is, the imaginary visible line portion A2 is formed at the operational device for the vehicle 10 by displaying the above-described three menu buttons 10a with the frames only. Specifically, the operational device for the vehicle 10 applies the line portion A2 inclined relative to the direction of the imaginary flow which is generated at the position where the operational device for the vehicle 10 is located. Preferably, the line portion A2 inclined at the angle of 50 degrees or greater relative to the direction of the imaginary flow is applied. Further, a blue-colored frame is preferably applied to the three menu buttons 10a. This is because the blue color is superior in the visibility.

Next, a second example of the operational device for the vehicle to which the display control device for the vehicle according to the present embodiment is applied will be described referring to FIG. 8. The operational device for the vehicle 10 of the liquid-crystal display device comprising the touch panel of the second example is used similarly to the above-described first example. Herein, elements which are denoted by the same reference characters as FIG. 7 have the same meanings as FIG. 4, specific descriptions of which are omitted here.

In the second example of the present embodiment, the operational device for the vehicle 10 displays three menu buttons 10a with a different-colored frame from the other buttons 10a as shown by a reference character B1, respectively. Specifically, the operational device for the vehicle 10 displays these three menu buttons 10a with the frames along a line portion B2 so that an imaginary line illustrated by the broken line B2 is visibly and imaginarily recognizable for the driver. That is, the imaginary visible line portion B2 is formed at the operational device for the vehicle 10 by displaying the above-described three menu buttons 10a with the frame, the color of which is different from the color of the frames of the other menu buttons 10a. Specifically, the operational device for the vehicle 10 applies the line portion B2 inclined relative to the direction of the imaginary flow which is generated at the position where the operational device for the vehicle 10 is located. Preferably, the line portion B2 inclined at the angle of 50 degrees or greater relative to the direction of the imaginary flow is applied. Further, the blue-colored frame is preferably applied to the three menu buttons 10a for the same reason descried above in the first example.

While the example of displaying the menu buttons 10a with the frames along the imaginary line portion A2 and the example of displaying the menu buttons 10a with the different-colored frame different from the other menu buttons 10a along the imaginary line portion B2 are described in the above-described first and second examples, the present invention is not limited to these. Any type of display manners can be applied to the menu buttons 10a arranged along the line portion as long as the operational device for the vehicle 10 is configured such that this line portion is comprised of the imaginary line portion which is visibly and imaginarily recognizable for the driver. Specifically, a display manner in which the menu buttons 10a arranged along the imaginary line portion is more noticeable to the driver (i.e., attracts the driver more) than the other menu buttons 10a may be applied. For example, in another example, any appropriate gradation may be applied to the menu buttons 10a arranged along the imaginary line portion so that these menu buttons 10a can be more noticeable than the other menu buttons 10a. In further another example, a specified texture may be applied to the menu buttons 10a arranged along the imaginary line portion so that these menu buttons 10a can be more noticeable than the other menu buttons 10a. In further another example, the brightness of the menu buttons 10a arranged along the imaginary line portion may be set to be higher than that of the other menu buttons 10a.

Next, a third example of the operational device for the vehicle to which the display control device for the vehicle according to the present embodiment is applied will be described referring to FIG. 9. An operational device for the vehicle 20 shown in FIG. 9 is a device which comprises plural physical type of buttons 20a (i.e., switches) which are operable for the driver, and is provided at the instrument panel. Each button 20a has an LED 20b. For example, the operational device for the vehicle 20 is the navigation device for the vehicle, the audio device, or the like.

In the third example of the present embodiment, the operational device for the vehicle 20 illuminates the respective LED 20b of three buttons 20a which are denoted by a reference character C1 with a specified color, which is different from a color of the LED 20b of the other buttons 20a which are denoted by a reference character C2. Specifically, the operational device for the vehicle 20 illuminates the respective LED 20b of the three buttons 20a arranged along a line portion C3 so that an imaginary line illustrated by the broken line C3 is visibly and imaginarily recognizable for the driver. That is, the imaginary visible line portion C3 is formed at the operational device for the vehicle 20 by illuminating the LED 20b of the above-described three buttons 20a with the specified color different from the color of the LED 20b of the other buttons 20a. Specifically, the operational device for the vehicle 20 applies the line portion C3 inclined relative to the direction of the imaginary flow which is generated at the position where the operational device for the vehicle 20 is located. Preferably, the line portion C3 inclined at the angle of 50 degrees or greater relative to the direction of the imaginary flow is applied. Further, the LED 20b of the above-described three buttons 20a is preferably illuminated with the blue color for the same reason descried above in the first example.

The present invention is not limited to the above-described manner in which the LED 20b of the buttons 20a arranged along the imaginary line portion C3 with the specified color different from the color of the LED 20b of the other buttons 20a. Any type of illumination manners can be applied to the LED 20b of the buttons 20a arranged along the imaginary line portion C3 as long as the operational device for the vehicle 20 is configured such that this line portion C3 is comprised of the imaginary line portion C3 which is visibly and imaginarily recognizable for the driver. Specifically, an illumination manner in which the buttons 20a arranged along the imaginary line portion C3 is more noticeable to the driver (i.e., attracts the driver more) than the other buttons 20a may be applied. For example, in another example, the LED 20b of the buttons 20a arranged along the imaginary line portion C3 may be illuminated only, without illuminating the LED 20b of the other buttons 20a.

Hereafter, the operations and effects of the first through 3 examples of the above-described present embodiment will be described. Herein, while the operations and effects of the present embodiment including the first through third examples will be described, it is suitably omitted to cite the corresponding reference characters of the respective elements (such as the operational device for the vehicle) here.

According to the present embodiment, since the operational device provides the imaginary line portion which is visibly and imaginarily recognizable for the driver, the driver's attention can be attracted to the operational device for the vehicle easily, so that the operational time (including the visually-recognition time) of the driver for the operational device for the vehicle can be shortened. Accordingly, the driver can be properly restrained from turning away the driver's eyes from the appropriate direction to be directed during the vehicle driving (i.e., the direction toward the traveling way) by shortening the time for seeing and operating the operational device.

Further, according to the present embodiment, since the line portion is inclined relative to the direction of the imaginary flow which corresponds to the optical flow visible for the driver during the vehicle traveling at the position where the operational device for the vehicle is located, the operational time (including the visually-recognition time) of the driver for the operational device can be shortened effectively. Particularly, by inclining the line portion at the angle of 50 degrees or greater relative to the direction of the imaginary flow, the operational time (including the visually-recognition time) of the driver for the operational device can be shortened greatly.

Further, in the present embodiment, it may not be necessary to change the arrangement of the icons on the existing display menu, the button arrangement of the existing device, or the like in order to change the display manner of the specified menu buttons 10a or the illumination manner of the LED 20b of the specified buttons 20a as described in the above-described first through third examples. Accordingly, the present embodiment can be properly configured such that the line portion is visibly and imaginarily recognizable for the driver.

The present invention should not be limited to the above-described embodiment (examples), and any other modifications or improvements may be applied within the scope of a sprit of the present invention.

For example, while the imaginary line portion which is visibly and imaginarily recognizable for the driver is used in the above-described embodiment (see FIGS. 7 through 9), a perfect (complete) line portion which is visibly and directly recognizable for the driver (such as the additive-display line 2 used in the above-described experiment) may be used in place of the imaginary line portion. Specifically, in a case in which the operational device for the vehicle is a display device, it may be configured such that the perfect (complete) line portion is displayed on a screen of the display device. Meanwhile, in a case in which the operational device for the vehicle is a device equipped with physical switches, it may be configured such that the perfect (complete) line portion is designed on a surface of a body of the device. In these cases, it is preferable that the line portion be inclined relative to the direction of the imaginary flow which corresponds to the optical flow visible for the driver during the vehicle traveling at the position where the operational device is located. Preferably, the line portion is inclined at the angle of 50 degrees or greater relative to the direction of the imaginary flow. The above-described other examples can provide the same operations and effects as the above-described embodiments.

What is claimed is:

1. A display control device for a vehicle, which is applied to a vehicle provided with an outside camera to image scenery in front of the vehicle and a display visible and operable for a driver, comprising:
 a processor coupled to a non-transitory memory configured to:
 presume an optical flow based on front scenery imaged by the outside camera;
 set an additive-display line to be applied to the display according to the optical flow presumed by the processor; and
 conduct a display control for the display based on the additive-display line set by the processor.

2. The display control device for the vehicle of claim 1, wherein the processor is configured to obtain an imaginary flow which is generated by extending the optical flow presumed by the processor to a position where the display is located and set a line which is inclined at a specified angle relative to a direction of said imaginary flow as said additive-display line.

3. The display control device for the vehicle of claim 2, wherein said specified angle is 50 degrees or greater.

4. The display control device for the vehicle of claim 2, wherein the processor is configured to presume a vanishing point of said optical flow based on the front scenery imaged by the outside camera as said presumption of the optical flow, and the processor is configured to obtain the imaginary flow based on said vanishing point presumed by the processor and a relative position to the display and set said additive-display line.

5. The display control device for the vehicle of claim 3, wherein the processor is configured to presume a vanishing point of said optical flow based on the front scenery imaged by the outside camera as said presumption of the optical flow, and the processor is configured to obtain the imaginary flow based on said vanishing point presumed by the the processor and a relative position to the display and set said additive-display line.

6. The display control device for the vehicle of claim 4, the processor further configured to presume a driver's state based on an image of a driver which is imaged by an inside camera provided in the vehicle, wherein the processor is configured to presume said vanishing point based on said driver's state presumed by the processor and said front scenery imaged by the outside camera.

7. The display control device for the vehicle of claim 5, the processor further configured to presume a driver's state based on an image of a driver which is imaged by an inside camera provided in the vehicle, wherein the processor is configured to presume said vanishing point based on said driver's state presumed by the processor and said front scenery imaged by the outside camera.

8. The display control device for the vehicle of claim 1, wherein the processor is configured to make the display display plural operational portions which are operable for the driver such that part of the plural operational portions is displayed in a different display manner from the other part of the plural operational portions, whereby said additive-display line is formed at the display.

9. The display control device for the vehicle of claim 2, wherein the processor is configured to make the display display plural operational portions which are operable for the driver such that part of the plural operational portions is displayed in a different display manner from the other part of the plural operational portions, whereby said additive-display line is formed at the display.

10. The display control device for the vehicle of claim 3, the processor is configured to make the display display plural operational portions which are operable for the driver such that part of the plural operational portions is displayed in a different display manner from the other part of the plural operational portions, whereby said additive-display line is formed at the display.

11. The display control device for the vehicle of claim 4, wherein the processor is configured to make the display display plural operational portions which are operable for the driver such that part of the plural operational portions is displayed in a different display manner from the other part of the plural operational portions, whereby said additive-display line is formed at the display.

12. The display control device for the vehicle of claim 5, wherein the processor is configured to make the display display plural operational portions which are operable for the driver such that part of the plural operational portions is displayed in a different display manner from the other part of the plural operational portions, whereby said additive-display line is formed at the display.

13. The display control device for the vehicle of claim 6, wherein the processor is configured to make the display display plural operational portions which are operable for the driver such that part of the plural operational portions is displayed in a different display manner from the other part of the plural operational portions, whereby said additive-display line is formed at the display.

14. The display control device for the vehicle of claim 7, wherein the processor is configured to make the display display plural operational portions which are operable for the driver such that part of the plural operational portions is displayed in a different display manner from the other part of the plural operational portions, whereby said additive-display line is formed at the display.

* * * * *